United States Patent [19]

Garcia

[11] Patent Number: 5,470,181
[45] Date of Patent: Nov. 28, 1995

[54] SAFETY DEVICE FOR MACHINE TOOLS

[76] Inventor: Richard J. Garcia, 304 Plum Dr., Exeter, Calif. 93221

[21] Appl. No.: 373,574

[22] Filed: Jan. 17, 1995

[51] Int. Cl.⁶ .............................. B23C 9/00; B23B 47/00; B23Q 11/00
[52] U.S. Cl. .............................. 409/134; 403/109; 408/4; 408/710; 409/231
[58] Field of Search ................................. 29/57, DIG. 51; 409/134, 231, 218, 214, 237; 408/135, 4, 16, 235, 241 R, 710; 74/612; 403/109, 362

[56] References Cited

U.S. PATENT DOCUMENTS

| | | | |
|---|---|---|---|
| 1,425,388 | 8/1922 | Klausmeyer | 408/710 X |
| 2,154,745 | 4/1939 | Hedgpeth | 408/135 X |
| 2,681,152 | 6/1954 | Stindt | 403/362 X |
| 2,893,273 | 7/1959 | Berthiez | 408/710 X |
| 3,124,015 | 3/1964 | Mottu | 408/235 |
| 3,913,192 | 10/1975 | Bäumer et al. | 29/1 A |
| 4,215,961 | 8/1980 | Babel | 409/231 |
| 4,674,908 | 6/1987 | Kagerer | 403/109 |
| 5,154,449 | 10/1992 | Suei-Long | 403/109 X |

FOREIGN PATENT DOCUMENTS 364676 11/1962 Switzerland ............................. 408/135

Primary Examiner—William Briggs
Attorney, Agent, or Firm—Dennis B. Haase

[57] ABSTRACT

The present invention relates to a safety tool having particular, although not exclusive, use in conjunction with machine tools in which a locking device is employed to lock and unlock a movable machine element and wherein a counterweight is employed in conjunction with a cap that fits over the locking device to overcome the inertial focus on the locking device which tends to urge the locking device toward a locked position.

17 Claims, 2 Drawing Sheets

SAFETY DEVICE FOR MACHINE TOOLS

The present invention relates generally to devices for the enhancement of safety in the use of machine tools, such as milling machines, and more particularly to devices in which a lever is used to lock and unlock a working element of such machine tools, and wherein the invention overcomes the tendency of the lever to inadvertently lock up in use.

BACKGROUND OF THE INVENTION

1. Field of the Invention

In the machine tool field it is common to secure movable elements of such tools with a clamping-type locking device. The jaws of such clamps are commonly expanded and contracted by the use of a threaded actuator in which the threads have a sufficiently large pitch that a few degrees of revolution of the actuator will clamp or unclamp the element to be held.

Exemplary of such machines is the Bridgeport-type milling machine wherein the quill housing encircles a spindle, which carries a cutting tool. The spindle is moved longitudinally in or out of the quill housing to control the position of the cutting tool and to advance the tool into, and away from, the work piece for operations such as boring, drilling, reaming, or tapping.

In order to fix the position of the spindle, a screw-type locking device, commonly referred in the industry as a quill lock, is used on such machines to clamp the spindle in place when linear movement is to be prevented.

In a typical case, the quill lock is actuated by a small handle that extends radially outwardly from the screw portion at right angles. Such devices pose a problem, however, to the operator, which was apparently never considered by the manufacturer to be a concern in use. Specifically, the quill lock does not always fully release when the locking lever is in the release position, or may move from the release position to a partially locked position, due to downward forces generated on the screw portion of the lock by the protruding lever which, for safety reasons, is normally in a raised portion.

This movement occurs due to gravitational pull, which tends to urge the lever downwardly toward the locked position. As a result of such movement, a drag is created on the spindle as the operator tries to advance or retract it during operation. This tendency to self tighten, not only interferes with the smooth operation of the spindle stroke, but becomes a distraction to the operator, who may try to fight the quill lock at the same time as he is operating the machine, and in so doing, lose concentration, to the detriment of the job and perhaps his personal safety.

2. Overview of the Prior Art

Several prior art patents have been unearthed which pertain to machine tools that employ quill and locking devices therefor. These prior art patents are, however, more illustrative of the problem than the solution, and none of them specifically address the environment of the present invention, or the relief that it offers for the problem addressed.

By way of example, Wood U.S. Pat. No. 4,175,898 depicts a machine tool of the general type for which the present invention has particular utility. However, the inventor was primarily concerned with locking and unlocking the tool holder, which he accomplishes by means of a powered drawbar.

Fox U.S. Pat. No. 4,349,945 relates to a horizontally disposed machine tool, having essentially the same mechanism, disposed in a different attitude, but the problem remains the same. Again, the Fox disclosure does not address the problem, but rather has as its focus a power head locking device.

The Kampmeier U.S. Pat. No. 2,957,393 relates to a hydraulic clamping device, which is an alternative to the more common mechanical devices. The Csencsics U.S. Pat. No. 3,586,455 employs pneumatics to move the quill, and, at least to that extent, alleviates the problem addressed herein. The patents to Vincent, U.S. Pat. No. 3,003,412; Sedgwick, U.S. Pat. No. 3,457,833, and Lehman U.S. Pat. No. 4,209,273 all reflect, in a general sense, the state of the art in machine tools, without addressing the problem referenced by the present invention.

Bridgeport-type machine tools have been in use for a number of years, and the problem of drag on the spindle due to the quill lock has existed for the same period, yet until now an adequate and safe solution has evaded the industry.

Indeed, until the advent of the present invention, machinists have attempted to address the problem of quill drag by manually holding the lock lever up with one hand while operating the quill feed handle with the other. The biggest disadvantage to this method is that it requires the use of both hands and does not allow the operator to use a hand to hold onto the work piece, or fixture, when using the mill as a drill press for drilling and tapping.

More innovative operators have found that the lock lever can be held in the unlocked up position by wrapping a rubber band around the lever and attaching it to a nut, or other protuberance, on the mill head in order to retain the lever in the "up", or unlocked, position during operation. However, like most "make shift" cures, there are drawbacks, and in this case the rubber bands tend to fly off and/or wear out quickly in the oily environment. When the rubber band lets go, particularly during operation, a potentially dangerous situation is created.

The industry has seen other devices to cure this problem, although it does not appear that they are patented. For example, a device called the "Quill Free" is available, and operates similar to the rubber band method. It consists of mounting hardware to fasten a tension spring between the lever and a nut, or other mounting device, on the mill head. The tension of the spring keeps the lever in the unlocked position.

SUMMARY OF THE INVENTION

The focus of the present invention is relatively specific to a problem that has hampered machinists who have used Bridgeport-type machine tools since their introduction. Clearly, however, the solution presented may have other applications in the machine tool industry.

It is a primary objective to permit selective modification of the quill lock on a machine tool to continuously bias the quill lock to its unlocked position during use of the machine tool.

An objective ancillary to the foregoing, is to provide the modification as described above in such a manner that the bias thereof is readily overcome to permit tightening of the quill lock at the option of the operator.

Yet another objective of the present invention is to provide a device constructed in accordance with the present invention and capable of accomplishing the objectives herein stated and which is removably mounted to a machine having a quill lock, and which will remain in place until intentionally physically removed.

A further objective of the present invention is to make the safety tool of the present invention as compact and free of sharp or protuberances as possible in order to assure that the machinist does not inadvertently contact the tool, with adverse consequences.

The foregoing, as well as several other objects and advantages of the present invention will become apparent to one skilled in the art as the following detailed description of a preferred embodiment is understood, in conjunction with accompanying drawings, wherein:

DESCRIPTION OF A PREFERRED EMBODIMENT

Figure 1:
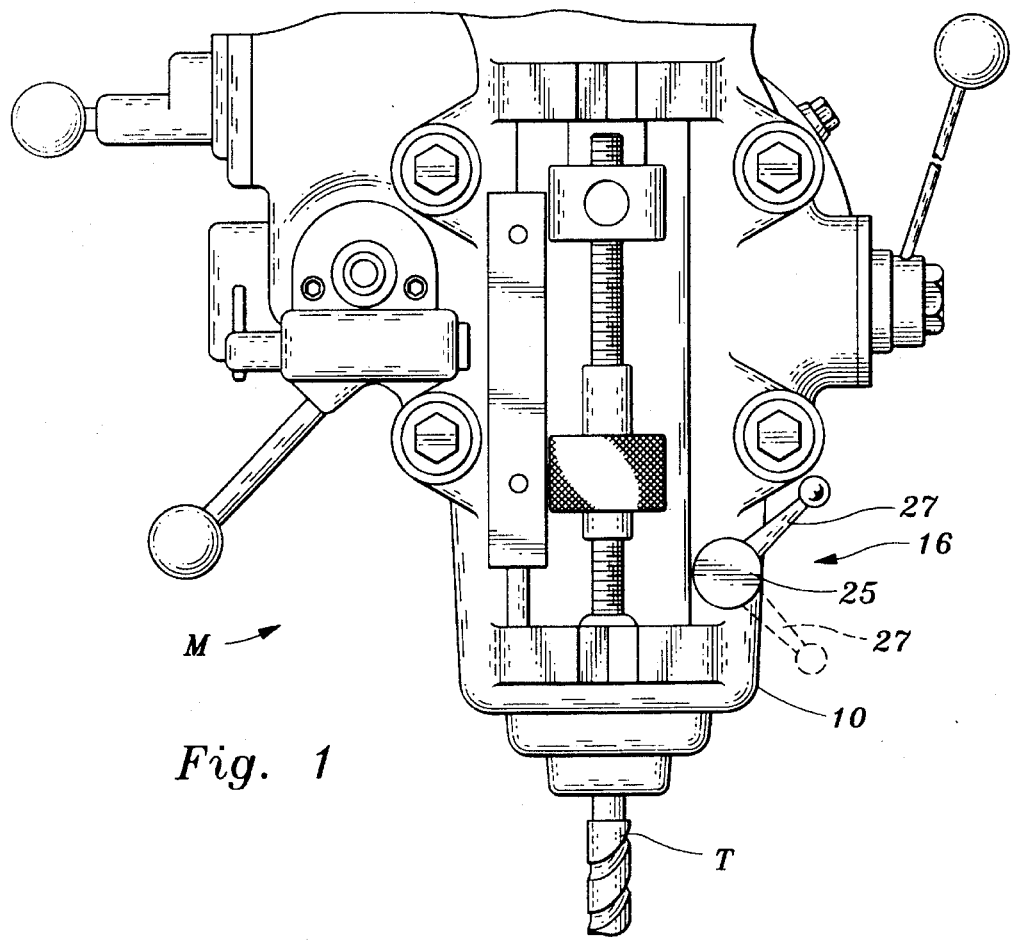
FIG. 1 is a side elevation of a Bridgeport-type milling machine illustrating a quill lock mechanism of the type for which the present invention has particular, although not exclusive utility.

With reference now to the drawings, and more particularly to FIG. 1, a machine tool such as a Bridgeport-type milling machine is illustrated at M, and includes a quill housing 10. The quill housing functions as a positioning device for a tool carrying spindle 14, which reciprocates within the quill housing to move a cutting tool T towards and away from a work piece.

In order to permit the machine operator to fix the position of the spindle 14, either at or on the work piece, such as during a routing procedure, or in a retracted position away from the work piece, a quill locking device 16 is provided.

Figure 2:
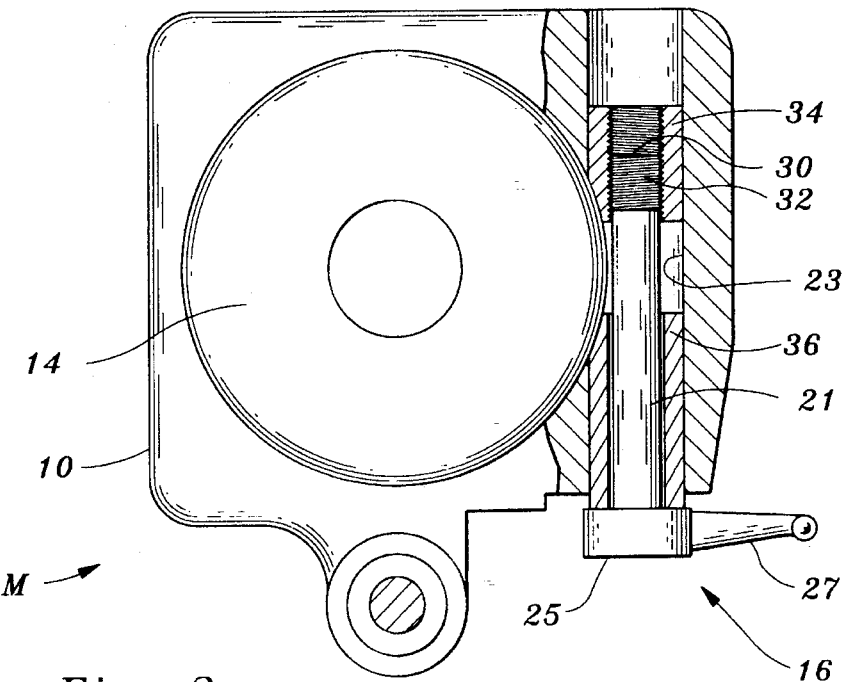
FIG. 2 is a top plan view of the machine tool of FIG. 1, partially sectioned to show the inner workings of the quill lock.
Figure 3:
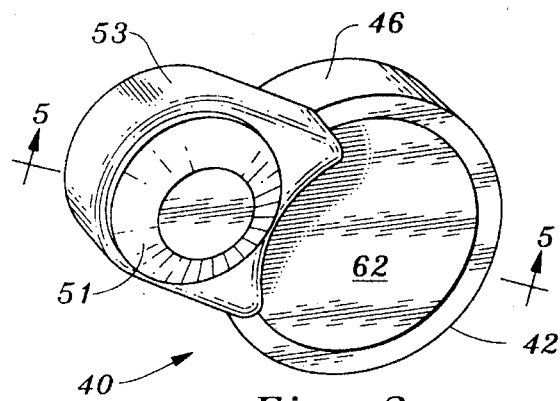
FIG. 3 is a pictorial representation of the safety tool of the present invention, illustrating the inter-relationship of the various parts.

The quill lock 16 is graphically depicted in FIG. 2, and comprises, in the illustrated form, an elongated bolt 21, which inserts into a passage 23 in the quill housing 10. A bolt head 25 is, as may be seen in the drawings, an enlarged disc-shaped appendage which is fitted at an end of the bolt 23 at the outside end of the passage 23, and is, itself, outside the quill housing. In order to permit tightening and loosening of the bolt, a handle, or lever, 27 is affixed in the cap 25, extending radially outwardly therefrom, and at right angles to the longitudinal axis of the bolt 21.

The working end 30 of the bolt 21, being the end opposite the cap 25, is threaded as at 32, in a well known manner. The threaded portion 32 engages a pair of locking sleeves 34 and 36. The locking sleeves 34 and 36, at least one of which is threaded, embrace the spindle, and in the specific example illustrated, one has a right hand thread and the other elongated so as to abut the head of the bolt. The configuration may vary, however, from machine to machine. Thus, rotation of the bolt 21, either clockwise or counterclockwise, will result in the tightening or clamping of the locking sleeves about the spindle to secure it in a predetermined position, or the loosening of the locking sleeves about the spindle, in order that it may be moved within the quill housing.

In the illustrated case, the pitch of the threads on the bolt is such that relatively little rotation of the bolt is required to either clamp or release the spindle. Moreover, for safety reasons, the lever 27 is preferably in the up position when the spindle is unlocked, and facing downwardly when it is locked.

The preferred position of the quill lock lever 27 creates a problem for the machine operator, in that the inertial pull on the lever 27 tends to urge the lever downwardly towards the clamping position of the quill lock. As a consequence, a certain amount of drag is created on the spindle, as it is advanced into a work piece, such as in a drilling operation. Even a small amount of drag is a distraction for the operator and can, and often does, result in damage to the work piece, or the work piece being out of tolerance. Moreover, a safety compromise is created for the machinist, who, depending on his or her response to the unexpected drag, may attempt to correct the situation manually, while continuing to attempt to do his work with a potential for resultant injury.

The overriding purpose of the present invention is to eliminate distractions such as those described herein above, by eliminating the root cause, namely the inadvertent movement of the quill lock from its unlocked position, to a position wherein drag is created on the spindle. This is accomplished, in accordance with the present invention, by the provision of a safety tool 40.

Figure 4:
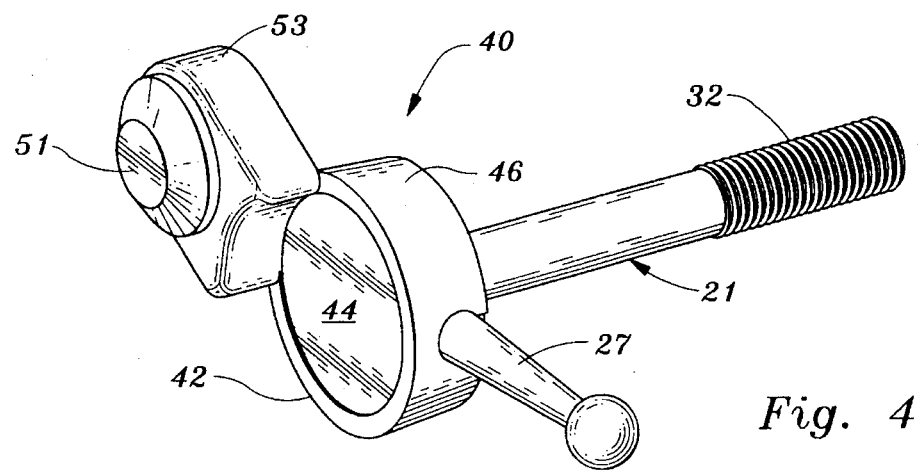
FIG. 4 illustrates the tool of the present invention mounted to the quill lock of the machine tool of FIG. 1.
Figure 6:
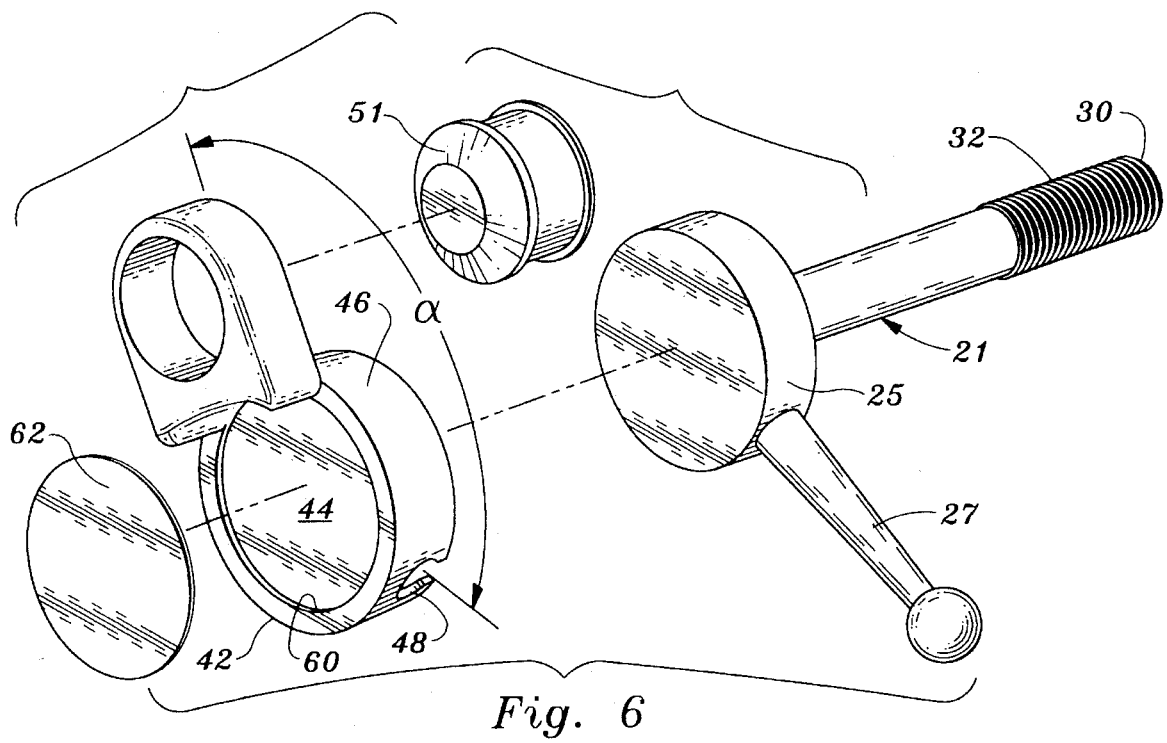

With reference primarily to FIG. 4, the safety tool is seen as comprising a cap 42, which may be made in any well know manner, of any number of well know materials. The cap has a circular disc portion 44, from which a circumferential side wall 46 depends at right angles. The disc 44 and side wall 46 together form a cavity, of such dimension that the cap fits snugly over the bolt head 25. Where a more permanent engagement is desired, the cap may be glued, or fixed in some other manner to the bolt head.

The side wall 46 is formed, at one point, with a cutout 48, which is intended to encircle the greater portion of the diameter of the lever 27 at the point at which it attaches to the bolt head 25 in order that the integrity of the snugness of fit of the cap over the bolt head is uncompromised.

Figure 5:
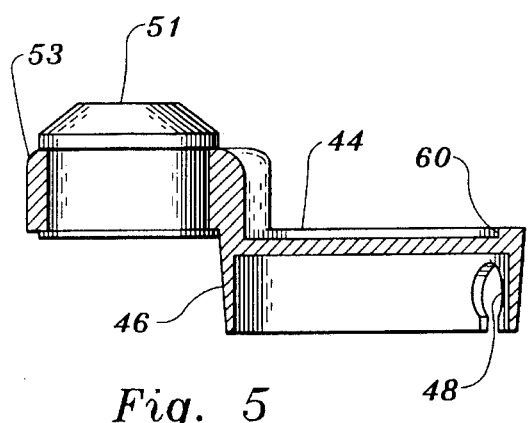
FIG. 5 is sectional view of the safety tool of the present invention, taken along lines 5—5 of FIG. 3; and, FIG. 6 is an exploded view of the safety tool of FIG. 3.

In order to overcome, or at a minimum neutralize, the effects of inertia on the lever 27, and to minimize the adverse effects of inadvertent bumping of the lever, there is provided, in keeping with the invention, a counterweight 51. The counterweight may assume any number of shapes and sizes without departure from the invention, including the small cylindrical member illustrated.

in order to make the safety tool as compact and inconspicuous as possible, the counterweight 51 is disposed adjacent to the cap 42, and this is accomplished, in accordance with the invention, by the use of a retainer ring 53 which is affixed, in any suitable fashion, including integral formation to the cap 42, with the side wall 46 thereof. The retainer ring is generally parallel with the disc portion 44, and as best seen in FIG. 5, offset outwardly and away from the knob or bolt head 25.

In keeping with the objective of compactness and maximum utility, the position of the counterweight is important. Clearly, in order to keep the entire tool compact, yet effective, the counterweight must be as small as possible, and as close to the side wall as possible, while generating sufficient counter force to overcome the effective weight of the lever 27. The position of the counterweights relative to the lever 27 and the amount of weight to be used is a function of the location and center of mass of the lever, and the distance of the counterweight from the longitudinal axis of the bolt 21. In a Bridgeport machine, the counterweight is positioned in radial opposition to the lever on a radial from the longitudinal axis of the bolt 21, which forms an angle α relative to the radial of the lever 27 which is greater than 110 degrees and less than 180 degrees, with a range, for a counterweight disposed approximately one inch from the longitudinal axis of the bolt, and weighing between 5 to 28 grams.

Yet another feature of the invention is the provision of a small recess 60 on the face of the disc 44. The recess is adapted to receive a circular plate 62 which can be snapped, or otherwise fitted in place in the recess 60. The plate may have safety, or use, instructions on it, trademark information, or any other information that the maker may wish to impart to the user.

Having described a preferred embodiment of my invention, what is claimed is:

1. A safety tool for use in overcoming the effects of inertia on a locking device disposed on a machine tool to lock and unlock a longitudinally moveable machine element, wherein the locking device includes a bolt having a bolt head at one end thereof, and a radially outwardly extending lever movable between a locking and unlocking position of said locking device, said safety tool comprising in combination:

a cap, said cap being adapted to and fit upon the knob of the locking device, said cap having a disc portion, a side wall depending from said disc, and an opening defined by said disc and said side wall for encircling the lever of the locking device;

means defining a counterweight, said counterweight being connected to said cap in radial opposition to said opening in said side wall, said counterweight being positioned to overcome the effective mass of said lever so as to urge said lever toward an unlocked position.

2. The safety tool as set forth in claim 1, wherein means defining a retainer ring is provided for positioning and holding said counterweight relative to said cap.

3. The safety tool as set forth in claim 1, wherein said cap is integrally formed with a retainer ring, said retainer ring being adapted to receive said counterweight.

4. The safety tool as set forth in claim 2, wherein said counterweight is removably received in said retainer ring.

5. The safety tool as set forth in claim 3, wherein said counterweight is removably received in said retainer ring.

6. The safety tool as set forth in claim 1, wherein said cap is adapted to removably snap in place about said knob.

7. The safety tool as set forth in claim 1, wherein said cap is permanently affixed in position about said knob.

8. The safety tool as set forth in claim 1, wherein said cap is formed with a recess therein, a plate, said plate adapted to be affixed to said cap in said recess.

9. The safety tool as set forth in claim 2, wherein said counterweight is disposed on a radial from the longitudinal axis of the bolt which forms an obtuse angle with the radial of the lever.

10. The safety tool as set forth in claim 3, wherein said counterweight is disposed on a radial from the longitudinal axis of the bolt which forms an obtuse angle with the radial of the lever.

11. The safety tool as set forth in claim 9, wherein said obtuse angle ranges between 110 and 180 degrees.

12. The safety tool as set forth in claim 10, wherein said counterweight is disposed on a radial from the longitudinal axis of the bolt which forms an obtuse angle with the radial of the lever.

13. The safety tool as set forth in claim 8, wherein said plate carries a message.

14. The safety tool as set forth in claim 2, wherein said retainer ring is offset relative to the plane of said disc of said cap.

15. The safety tool as set forth in claim 14, wherein said offset is in a direction away from the knob when said cap is in position thereon.

16. The safety tool as set forth in claim 3, wherein said retainer ring is offset relative to the plane of said disc of said cap.

17. The safety tool as set forth in claim 3, wherein said offset is in a direction away from the knob when said cap is in position thereon.

* * * * *